United States Patent [19]
Milden

[11] Patent Number: 5,421,728
[45] Date of Patent: Jun. 6, 1995

[54] IN-FLIGHT RADAR WARNING RECEIVER TRAINING SYSTEM

[75] Inventor: Mark R. Milden, Albuquerque, N. Mex.

[73] Assignee: Honeywell Inc., Minneapolis, Minn.

[21] Appl. No.: 207,440

[22] Filed: Mar. 7, 1994

[51] Int. Cl.$^6$ .............................................. G01S 7/40
[52] U.S. Cl. ...................................... 434/5; 342/169; 342/170; 342/171
[58] Field of Search ............... 434/2, 5; 342/169, 170, 342/171, 172, 173

[56] References Cited

U.S. PATENT DOCUMENTS

| | | | |
|---|---|---|---|
| 4,192,082 | 3/1980 | Deaton et al. | 434/2 |
| 4,423,418 | 12/1983 | Pearlman | 343/17.7 |
| 4,424,038 | 1/1984 | Tingleff et al. | 434/2 |
| 4,729,737 | 3/1988 | Reagan et al. | 434/35 |
| 4,959,015 | 9/1990 | Rasinski et al. | 434/2 |
| 5,384,572 | 1/1995 | Michaels et al. | 342/169 |

Primary Examiner—John B. Sotomayor
Attorney, Agent, or Firm—George A. Leone, Sr.; Ronald E. Champion

[57] ABSTRACT

An in-flight radar warning receiver training system for use with a radar warning receiver (RWR) includes a real on/off switch for switching real threat track file data to a formatter. A generator produces threat/RWR simulated threat track file data. A merge operator combines formatted real threat data with the threat/RWR simulated threat track file data to form a combined threat track file. A prioritization method orders the combined threat track file data into prioritized threat track file data which is routed to a symbol generator, an audio/voice generator, and a memory for storing threat events having an input connected to the priority data output.

20 Claims, 2 Drawing Sheets

IN-FLIGHT RADAR WARNING RECEIVER TRAINING SYSTEM

BACKGROUND OF THE INVENTION

1. Field of the Invention

The present invention is directed to the field of in-flight training systems, and in particular, to an in-flight radar warning receiver training system which merges real threat indications with simulated threat indications.

2. Discussion of the Prior Art

Prior in-flight training systems for radar warning receivers have relied heavily on simulated threat signals provided from a computer memory. While such systems are useful, they are limited to providing simulated threat indications. Previous designs in this field have not had the capability to merge real threat indications with simulated indications.

U.S. Pat. No. 4,423,418 issued Dec. 27, 1983 to Pearlman entitled "Simulator of Multiple Electromagnetic Signal Sources Such As in a Radar Signal Field" discloses a technique for simulating various signals such as those from radar emitters. As the receiver is turned to a new bandwidth, the simulating system responds by generating any signal or signals that exist in the new bandwidth.

U.S. Pat. No. 4,729,737 issued Mar. 8, 1988 to Reagan et al. entitled "Airborne Laser/Electronic Warfare Training System" is directed to a system for training aircrews. The Reagan et al. device is particularly directed to training crews of slow-moving aircraft in the use of electronic warfare equipment. It simulates both mobile threats and stationary threats. A memory aboard the training aircraft stores data representing the geographic location and identity of each deployed stationary threat. A controller continually compares either the stored or received location data with data providing the instantaneous position of the aircraft to determine the direction and distance to each of the simulated threats. Each threat is embodied by an independently operating, ground based radio frequency transmitter unit.

U.S. Pat. No. 4,424,038, issued Jan. 3, 1984 to Tingleff et al. entitled "Inflight Aircraft Training System" provides a training apparatus for military aircraft warning receivers. The device proposed by Tingleff et al. is plug-compatible with standard receiver processors and provides training scenarios responsive to pilot maneuvering. The device includes a processor which receives inputs from the initial navigation equipment, memory and radar warning receiver control panel to control the standard receiver video display to generate the training scenario. Training scenarios are pre-programmed into a Radar Warning Receiver (RWR) simulator.

U.S. Pat. No. 4,959,015 issued Sep. 25, 1990 to Rasinski et al. entitled "System and Simulator for In-Flight Threat and Countermeasures Training" teaches an interactive trainer for electronic countermeasures simulation. Threat scenarios are stored in computer memory and recalled at a push button display counsel.

In contrast to the prior art, the present invention provides a system for performing in-flight, real-time Radar Warning Receiver (RWR) training which optionally merges real and simulated threat indications. The present invention is a self-contained device, and no modifications are required to external equipment to support an RWR training system built in accordance with the present invention. The present invention provides RWR training simulations having realistic RWR display symbology and audio/voice indications.

The present invention is improved over other approaches to in-flight RWR training. For the first time the present invention provides a system which merges real threat reports with simulated threat reports to create comprehensive and realistic threat symbology and audio/voice indications. No modifications to the actual RWR are required to support RWR training using the training system provided by the present invention.

SUMMARY OF THE INVENTION

In one aspect of the invention an in-flight radar warning receiver training system (IRWRTS) accepts real radar warning receiver (RWR) track file reports, formats them to be compatible with in-flight training processes and, in contrast to the prior art, combines the results of threat/RWR simulations with real threat information received from an on board, standard RWR to form combined threat track file data. The combined threat track file data is passed to a prioritization process that orders threat reports based on one or more priority schemes so as to provide a prioritized threat list. The prioritized threat list is used to create the RWR display symbology and RWR audio/voice indications. In addition, threat track file data changes may be stored in a data transfer device for mission replay.

In one operating mode of the invention, a conventional RWR may operate without RWR training being active. In this way, real threat track file reports are formatted and prioritized using the same processes that are used when the RWR training function is active.

In yet another mode of operation of the invention, the training RWR system may be used without a real RWR being active, or even installed in the aircraft. In this mode, simulated threat track file reports are formatted and prioritized using the same processes that are used when the real RWR is activated.

In still another aspect of the invention, a power off default switch operates in a default mode to pass real RWR video symbology to an RWR display if the RWR training system has failed and power has been removed.

In still another aspect of the invention, the IRWRTS may be permanently installed in an aircraft since the aircraft and RWR may always be mission ready.

Other features, advantages, and objects of the invention will be apparent through the description of the preferred embodiment, claims, and drawings herein wherein like elements have like reference characters.

DETAILED DESCRIPTION OF THE PREFERRED EMBODIMENT

As employed in the description of the invention herein, it will be understood that a threat is generally defined as a radar emitter that is associated with hostile air defense systems. A real threat is generally defined as an actual radar system that is located in the real world. A training threat is generally defined as a simulated radar emitter. Depending on the context in which it is used, the term threat may also refer to a collection of radar emitters that work together to complete a target intercept. Such threats may include, for example, long range search radars, local target acquisition radars, target track radars, fire control radars, and other threat radars. The term threat system as used herein generally refers to a collection of emitters that are associated with a specific type of air defense system. A single emitter may be referred to herein as a threat.

Typically, a track file is generated to list the parameters that describe a threat. This is also called a threat track file and is typically associated with a single radar emitter. The list of parameters usually include physical data that is measured from the real threat radar signal, such as, for example, radar frequency, pulse width, pulse repetition interval, and other well known radar parameters. The parameters also include derived data that is determined through well known analysis of the physical data, such as threat type, threat mode, and other associated data types.

A real threat track file is produced by the RWR and includes both physical and derived data. A training track file is simulated by the IRWRTS and comprises substantially the same types of data that would be provided if the real RWR detected a real threat.

Figure 1:
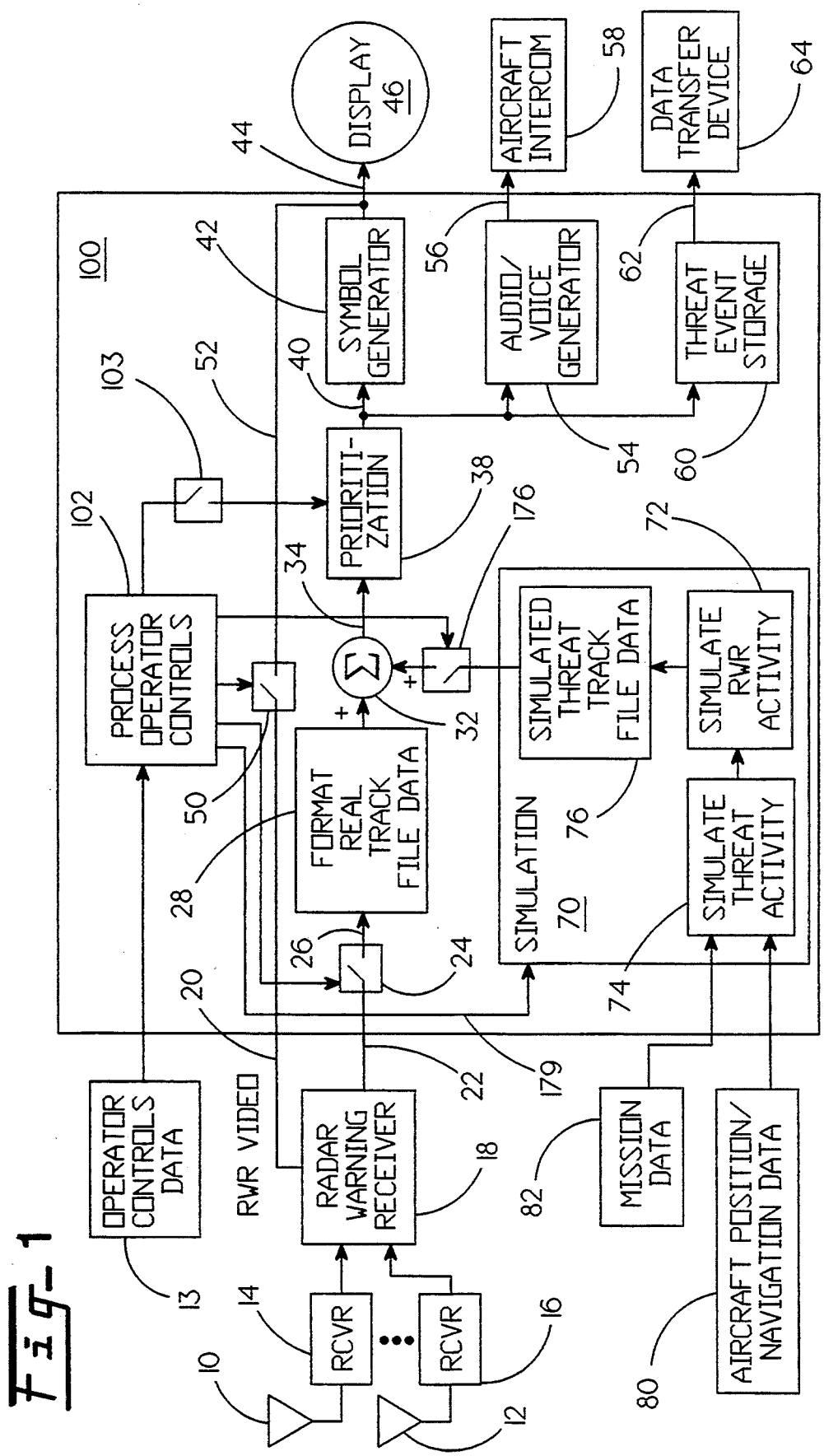
FIG. 1 shows schematically a block diagram of one embodiment of the in-flight radar warning receiver training system (IRWRTS) of the invention.

FIG. 1 shows schematically a block diagram of one embodiment of the in-flight radar warning receiver training system (IRWRTS) of the invention. Found in FIG. 1 are a plurality of receiving antennae generally indicated by reference characters 10 and 12 which are connected to a plurality of radar receivers generally indicated by receivers 14 and 16. It will be understood by those skilled in the art that the number of antennae and receivers may be any number which is suitable for use with a standard radar warning receiver and the number is not limited to the two such representative elements shown. The plurality of receivers 14, 16 provide inputs to a radar warning receiver 18 located on board an aircraft. The radar warning receiver 18 is a conventional radar warning receiver which provides an RWR video output 20 and a real threat track data file output 22.

In the example shown in FIG. 1, an in-flight training system 100 includes a real on/off switch 24, a process for formatting real track file data 28, a merge process 32, a prioritization process 38, a symbol generator 42, a power off default switch 50, an audio/voice generator 54, a threat event storage process 60, a training on/off switch 176 and a simulation process 70. The simulation process 70 may advantageously further comprise a threat activity simulator 74, a RWR activity simulator 72 and simulated threat track file data 76.

It will be understood by those skilled in the art that the features of the invention shown in block diagram form FIG. 1 are intended to represent various functions which may be implemented in software, electronic hardware or a combination of software and hardware or other equivalent means. In one embodiment of the invention, for example, the process for formatting real track file data 28, the merge process 32, and the prioritization process 38 may be implemented as software programs imbedded to be executed in a conventional microprocessor. The simulation process 70 comprising the threat activity simulator 74 and the RWR activity simulator 72 may be similarly implemented in software. The simulated threat track file data 76 and threat event storage process 60 may advantageously comprise computer memory elements such as random access memory or equivalent storage media which are well known in the art.

Inputs to the RWR in-flight training system include mission data 82 and aircraft position/navigation data 80, real threat track file data output 22 and RWR video output 20. The real threat track file data output 22 comprises data that is generated by and output from the RWR 18. The RWR 18 contains information describing each radar emitter that has been detected by the RWR 18 during the mission. RWR video output 20 comprises an actual video signal that is generated by the RWR. The video signal corresponds to the information contained within threat track files which are contained in the RWR.

Those skilled in the art will also appreciate that the real on/off switch 24, a power off default switch 50, and training on/off switch 176 may advantageously be performed by functions implemented in software. These switch functions may advantageously reflect switch positions of corresponding pilot selectable switches in the cockpit. An operator controls data interface 13 may store current and past switch positions of the (not shown) pilot selectable switches in the cockpit.

The operator controls data is presented to a process operator controls function 102. The process operator controls function 102 is coupled to each of the real on/off switch 24, power off default switch 50 and training on/off switch 176. The process operator control function 102 switches each such switch function to the same position as its counterpart switch in the cockpit. Thus, for example, if a pilot selects the real on/off switch in the cockpit to be off, this information will be stored in the operator controls data 13 and transmitted to the process operator controls function 102, which will, in turn, switch off real on/off switch 24. The other switches may be similarly controlled to reflect the cockpit status.

Operator controls data 13 represents the status of pilot selectable switches (not shown) located in the aircraft cockpit. This data can be provided in a well known manner by discrete wires connected directly to dedicated switches or by a digital data bus after being processed by some intermediate avionics integration processor (not shown). Data received by a digital data bus can be expanded to add additional flexibility and control to the operators without having to add more wiring into the aircraft. In a minimum configuration, the following types of operator control data are used for the IRWRTS:

Real On/Off Switch Status,
Training On/Off Switch Status, and
Priority Select Switch Status.

As discussed above, the process operator controls 102 function collects the various operator control data signals and provides the corresponding data values to each of the operator control elements. FIG. 1 shows several "switches" that may advantageously be under the control of the pilot or other operator through the process operator controls function 102. The pilot may use the real on/off switch to switch on or turn off the input of real threat track file data into the IRWRTS, so as to prevent real threats from being displayed, announced, stored or otherwise processed. The real on/off switch provides added flexibility and control to the pilot and may typically be implemented by software. The system ignores any data received from the RWR when this switch is in the OFF state.

The training on/off switch 176, for example, advantageously comprises a switch which directly corresponds to a pilot selectable switch in the cockpit that allows the simulation data to be merged with the real threat data by providing a connection between the simulated threat track file data 76 and the merge process 32. If the training on/off switch 176 is on, simulated threats are presented to the aircrew. If the training on/off switch 176 is off, the simulated data may still be generated, but the data will not be presented to the aircrew. The IRWRTS can also access this switch if a real threat is detected when the real on/off switch is off and the pilot has previously set up the mission parameters and switches for training to be aborted by a real threat. A typical implementation may be to program the system to ignore aircraft position and navigation data 80 such that simulated threats are never "in-range".

A priority select switch 103 allows the pilot to control the manner and order in which real and simulated threats are displayed and announced. Priority switching may be used to ignore threats which do not pose a risk to the host aircraft or to highlight those which are high risk. In one embodiment of the invention, an IRWRTS supports an expanded capability of the priority function. In accordance with the invention and in contrast to prior art training systems, the priority scheme may be applied equally to real and simulated threats. The prioritization function may be implemented in several ways depending on the complexity required to best support the aircrew. A simple and common form of implementation employs a HIGH ALTITUDE/LOW ALTITUDE toggle switch which is operated by the aircrew, as described herein below in further detail.

It is also possible to pre-determine the states of the operator control elements including the abovedescribed switches off-aircraft, prior to an aircraft mission, and have the values loaded into the IRWRTS from a data transfer device. Such an implementation, however, while being simple and straight-forward, limits the flexibility of the aircrew.

A training enable function line 179 may also be provided by the process operator controls function 102. This enable may correspond to a pilot selectable switch that enables or disables the entire simulation function. If the simulation function is enabled, threat activity will be generated and out of the simulation function. If this switch is disabled, no simulation processing will occur.

Mission data 82 comprises data that is setup off-aircraft, prior to an aircraft mission and is loaded into the IRWRTS by a known data transfer device (not shown). The mission data 82 may comprise the following types of data:
1. Simulated threat scenarios including threat types, position, range, and other known related parameters necessary for creating scenarios;
2. Threat and RWR parameters that are known to be required for generating realistic and accurate threat simulations; and
3. Terrain data to support making accurate line-of-sight determinations. In one embodiment of the present invention, the inclusion of terrain data is optional.

Since one source for the threat and RWR parameters is Department of Defense (DOD) data which may include sensitive information, it is usually desirable to load this data into volatile memory (RAM), from a data transfer device, rather than to have it reside permanently within the IRWRTS. Terrain data is also available from known DOD resources.

The aircraft position and navigation data 80 comprises current aircraft platform data as provided by the aircraft's navigation systems. Included in the aircraft position and navigation data 80 as data types are: present position, heading, altitude and ground speed.

The threat activity simulator 74 simulates threat encounters using the mission data that has been loaded into the IRWRTS. The mission data may advantageously include a threat scenario and threat parameters. The threat activity simulator 74 also provides radar emitter information to the RWR simulation process. The threat activity simulator 74 may advantageously include three sub-processes:
1. In-Range Determination. A simulated threat will not become active until the target aircraft is within range. Range for each threat is selectable by the aircrew or may be setup prior to a mission and loaded as part of the mission data.
2. Line-of-Sight Calculations. These calculations determine whether the threat radar emitter can detect the target aircraft. The line-of-sight calculations may be based on terrain data, radar cross section of target aircraft, and other factors known to bear upon threat simulation scenarios, depending on the desired complexity and fidelity of this function for a particular application.
3. Threat Modeling. Threat modeling is based on a general state transition diagram that is tailored by threat parameters for each specific threat type. Transitions between allowed states occur based on threat-to-aircraft range, and engagement times and can be modified to account for own-ship ECM effects.

The RWR activity simulator 72 generates simulated RWR track files that can be merged with real track files and passed on to the aircrew. The simulated RWR track files may advantageously be based on the threat emitter information.

The simulated threat track file data 76 may comprise the same format as the output of the real format process to simplify the merge function. Simulation techniques and equipment are well known in the art and need not be discussed at length for the purposes of this disclosure.

The symbol generator 42 may be any such well known device which generates appropriate video symbology to represent the threat emitters detected by the real RWR and the simulated by the threat simulation processes. The format of the video is variable depending on the type of display device being used in the aircraft. That is, the video format may be adapted in a well known manner to accommodate, for example, a stroke display or a raster display. The display 46 provides video symbology which represent the various threat emitters that are detected by the real RWR and simulated by the IRWRTS.

The audio/voice generator 54 may be any standard device which generates PRI-based audio tones, audio warning tones and/or synthetic voice messages as required to duplicate the audio interface from the real RWR. The audio signals are passed to the aircraft intercom network and are subsequently routed to the aircrew headsets. In one embodiment of the invention, the audio/voice generator 54 may comprise a well known aircraft intercom. An aircraft intercom provides an audio interface which duplicates the real RWR's audio interface to announce real and simulated threat emitters to the aircrew.

The threat event storage process 60 may be a basic polling program which periodically polls the real and simulated threat environment and saves information about significant events such that the threat environment can be recreated at a later time. This information is formatted for efficient storage into a data transfer device 64 and prioritized using the output of the prioritization process. The threat event storage process 60 may advantageously be implemented as a computer program residing in a microprocessor with a suitable memory. After a training mission, the data transfer device 64, and the data it has stored, may be removed from the aircraft and used for mission debriefing and mission replay purposes, for example.

The power off default switch 50 may advantageously be included because the radar warning receiver function is generally a mission critical element. The power off default switch 50 allows the RWR video information to be passed directly to the pilot display when the IRWRTS has failed and power is removed. The no-power state of the switch is closed, so as to pass video information as a default condition. Conversely, the energized state of the power off default switch is open. In one embodiment of the invention the power off default switch may comprise an electromechanical relay, or equivalent switching device. In this way the RWR video information may be displayed when the IRWRTS fails.

Operation of the Invention

Having explained the elements of the invention, it will be helpful to the understanding of the invention to now provide an example of the operation of the invention. In operation, the plurality of receiving antennae generally indicated as antenna 10 and antenna 12 carry radar signals to the plurality of radar receivers generally indicated as receiver 14 and receiver 16. The plurality of receivers 14, 16 provide inputs representative of the received radar signals to the radar warning receiver 18. The radar warning receiver 18 provides the RWR video output 20 to the IRWRTS 100 through the power off default switch 50. The real threat track data file output 22 is connected to the real on/off switch 24.

As can be seen with reference to FIG. 1, the IRWRTS 100 may be operated in several different modes, depending upon the configuration of the various switches. For example, in a default mode the power off default switch is engaged. When the power off default switch 50 is closed the RWR video information is carried on line 52 directly to the display line 44 to display 46. In another mode the real on/off switch 24 and the training on/off switch 176 may both be engaged. In yet another mode only the training on/off switch 176 may be engaged. In still another mode of operation only the real on/off switch 24 may be engaged.

When disengaged, indicated as opened in this example, the real on/off switch 24 operates to turn off the real threat track file data. When the real threat track file data is turned off, the training on/off switch may be engaged to pass simulated information to the merge process 32 in the case where, for example, a training-only threat scenario is desired. Similarly, the real on/off switch 24 may be engaged, or closed, to allow real RWR information to be merged with any simulated threat data in the merge process 32. It is likely that the real on/off switch 24 will be engaged in most cases, especially during non-training flights.

In operation, when the real on/off switch 24 is disengaged, the real RWR information may be monitored by the format real track file data process 28 to determine if a real threat has been detected. Based on a choice made by the aircrew, the detection of a real threat may be used to automatically engage the real RWR track file data 22 and to disengage the simulated track file data 76.

When the real on/off switch 24 is closed the real threat track data file information is passed onto the process for formatting real track file data 28. The formatting real track file data process 28 collects any threat track file data that is being received from the RWR and reformats and scales the data into a common format, with the simulated track file data, to feed the merge process 32.

The merge process 32 receives real threat track file data and simulated threat track file data and merges both sets of data into a combined database comprising a list of real and simulated truck files. By definition there are no duplicate track files so that each real and simulated track file is added to the combined list. The source of a threat track file is indicated by setting or resetting a real/training flag. The real/training flag may comprise a bit in a data word associated with each threat track file.

The merged track file data, containing both real and training threat track file data, is sent on line 34 into the prioritization process 38. The prioritization process 38 arranges the threat track file data such that the most important threats are ranked first. Each threat track file data is assigned a priority value such that the most important threats are ranked with the highest priority and the least important threat with the lowest priority.

Figure 2:
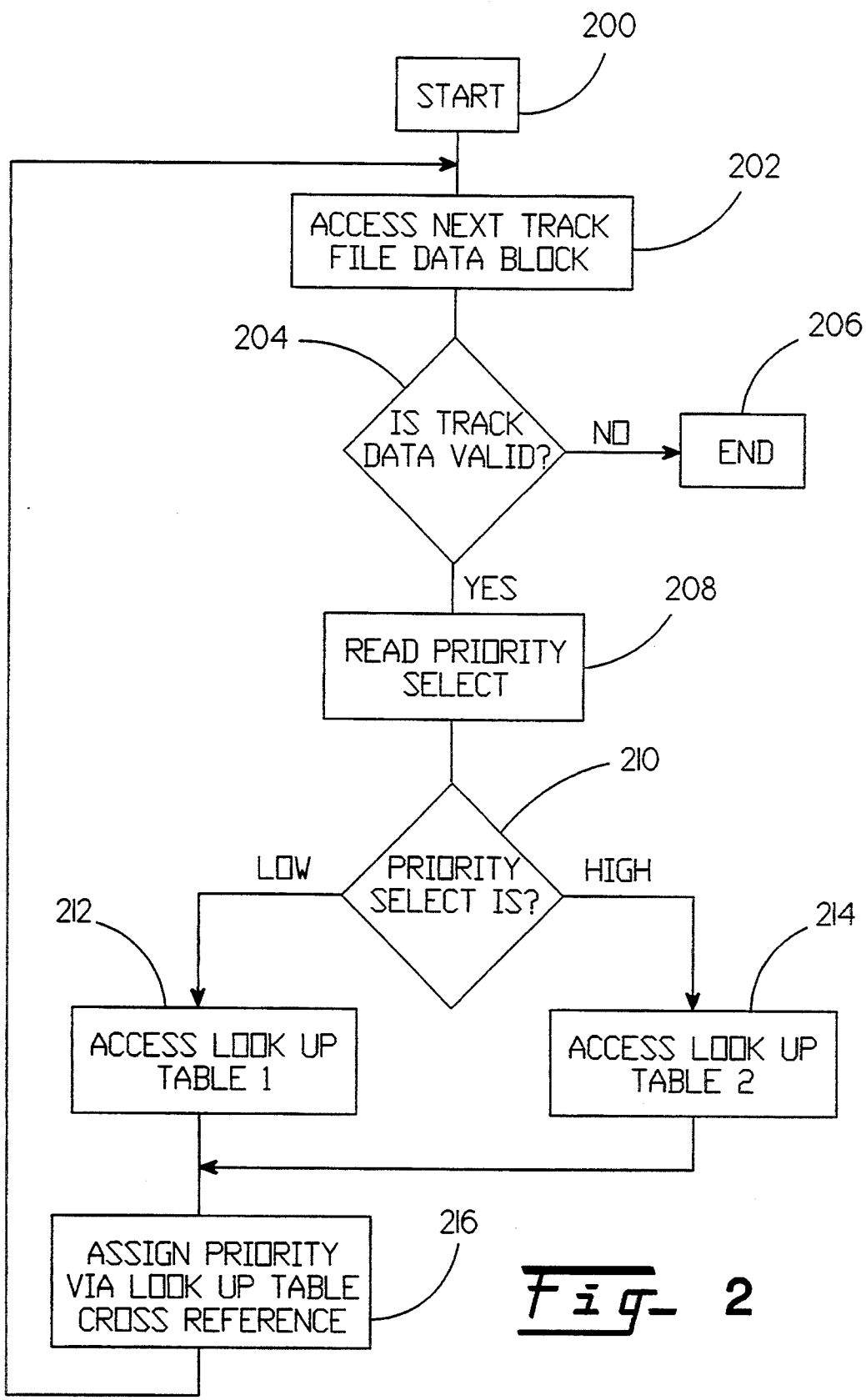
FIG. 2 shows schematically a flow diagram of one example of a prioritization method employed in the in-flight radar warning receiver training system (IRWRTS) of the invention.

Now referring to FIG. 2, a flow diagram of one example of a prioritization method employed in the in-flight radar warning receiver training system (IRWRTS) of the invention is shown schematically.

The prioritization method of the invention processes both the real and simulated threat track files and assigns a relative priority to each type threat track files, based on one or more priority schemes. When track files are generated, either by the real RWR or the simulations of the IRWRTS, each threat is assumed to have the same priority, as, for example, a priority of zero. The prioritization function assigns relative priorities to each of the real and simulated threat track files so that the most important threats are ranked with the highest priority. Priorities are typically assigned using a look-up table of data that cross references threat parameters with a priority level. A simple priority scheme may comprise a single look-up table that reference threat type against relative priority. One example of a simple priority scheme which may be used is shown in Table I.

TABLE I

Threat A = Priority 1,
Threat B = Priority 2,
Threat C = Priority 3, and
Threat D = Priority 2

In this case, the prioritization function cycles through each of the current track files one at a time and, based on the indicated threat type, assigns a priority value to the track file. Subsequent processes in the IRWRTS, such as the symbol generation, threat event storage and audio/voice generation functions will use the assigned priorities to determine which threat track files to process first. Since a pilot can be overloaded with too much information, priority schemes are generally used to ensure that the most lethal, highest priority, threats are displayed and that less important threats are suppressed. Such an approach may be employed so as to declutter the threat display.

It is typically known to use more complex priority schemes which use two or more look-up tables. The decision as to which look-up table is used, is often based on a pilot input, as through the priority select switch 103. A very typical priority select is HIGH or LOW ALTITUDE which may be selected through use of a toggle switch in the cockpit. As with the other switches, the priority select toggle switch will correspond to the priority select switch 103 which will operate in like fashion. As most likely implemented, selection of LOW ALTITUDE allows pilots flying a low altitude mission to ensure low altitude threat systems are assigned the highest priorities and high altitude threat systems are assigned lower priorities. Another priority select may be, for example, REAL or TRAINING THREAT to allow the pilot to emphasize any real threats over any simulated threats. The look-up tables themselves may also become more complex by cross-referencing priority assignments based on more than one threat parameter. For example the following two look-up tables, Tables II and II, are typical for a priority scheme based on altitude and the threat type and threat mode parameters.

TABLE II

| LOW ALTITUDE PRIORITY |
| --- |
| Threat A in Mode 1 = Priority 1 |
| Threat A in Mode 2 = Priority 3 |
| Threat B in Mode 1 = Priority 2 |
| Threat B in Mode 2 = Priority 3 |

TABLE III

| HIGH ALTITUDE PRIORITY |
| --- |
| Threat B in Mode 1 = Priority 1 |
| Threat B in Mode 2 = Priority 3 |
| Threat A in Mode 1 = Priority 2 |
| Threat A in Mode 2 = Priority 3 |

The IRWRTS priority process may be implemented using known programming techniques to accept a number of priority select variables and multiple look-up tables using different types of threat parameters. However, since it is important for the pilot to understand what is transpiring during a mission, prioritization processes tend to be of moderate complexity. For example, a prioritization process may comprise one priority select pointing to one of two look-up tables.

Still referring to FIG. 2, the prioritization method of the invention starts at block 200. At process step 202, the next track file data block is accessed from either the simulated threat track file data or the formatted real track file data. At process step 204, a decision is made as to whether or not the track data is valid. Typically, the decision at step 204 is made based upon coding and end of data message or stop flag. That is, the process continues to look for data blocks of track file data until it processes the last data block and the process ends at step 206. If the track data is valid, the priority select function is determined at step 210.

The priority select function is typically set by the pilot as explained above. In this example, HIGH ALTITUDE and LOW ALTITUDE switching controls the priority select. At decision block 210, the process continues based upon the priority select set by the pilot. If a low altitude priority has been selected, the process proceeds to step 212 which accesses a first look up table, such as Table II above. If a HIGH ALTITUDE priority select has been set by the pilot, the process accesses a second table, such as look up Table III at step 214. At step 216, following the look up table access in either step 212 or 214, a priority value is assigned according to the value stored in the look up table. The process then returns to step 202 to access the next track file data block, and the process repeats until all data blocks have been read and valid track data has been exhausted.

The invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

For example, the teachings of the present invention are also applicable to other Electronic Warfare (EW) Equipment Training. For example, an EW equipment training system, such as an active radar jammer or a dispenser system, may be implemented by substituting that EW system for the real Radar Warning Receiver with simulated EW equipment activity and using the appropriate priority, display and audio processes.

Furthermore, one or more EW equipment training systems including, but not limited to, a radar warning receiver, a radar jammer, a flare/chaff dispenser, and other training equipment can be combined together into a single training system to develop an in-flight EW Training function for an entire EW suite.

The embodiments of the invention in which an exclusive property or right is claimed are defined as follows:

1. An in-flight radar warning receiver training system for use with a radar warning receiver (RWR), the in-flight radar warning receiver training system comprising:
   a) means for formatting real RWR track file reports to produce formatted real threat data;
   b) means for generating threat/RWR simulated threat track file data;
   c) means for merging the formatted real threat data with the threat/RWR simulated threat track file data to form a combined threat track file at an output, wherein the merging means has a first input coupled to receive the formatted real threat data, and a second input coupled to receive the threat/RWR simulated threat track file data; and
   d) means for prioritizing the combined threat track file data, the prioritizing means being connected to receive the combined threat track file data from the merging means, the prioritizing means including an output for carrying prioritized threat track file data.

2. The in-flight radar warning receiver training system of claim 1 further comprising means for generating RWR display symbology connected to the output for carrying the prioritized threat track file data.

3. The in-flight radar warning receiver training system of claim 1 further comprising means for storing threat track file data, the storing means being connected to receive threat track file data from the prioritizing means.

4. The in-flight radar warning receiver training system of claim 1 further comprising, means for generating RWR audio/voice indications.

5. The in-flight radar warning receiver training system of claim 1 wherein the prioritizing means comprises a computer program that orders threat reports based on one or more priority schemes.

6. The in-flight radar warning receiver training system of claim 1 further comprising means for switching connected between the radar warning receiver and the formatting means.

7. The in-flight radar warning receiver training system of claim 1 further comprising a means for display and a power off default switch connected to bypass the formatting means, merging means, prioritizing means and means for generating RWR display symbology so as to send real RWR video symbology to the display means when the power off default switch operates in a default mode.

8. An in-flight radar warning receiver training system for use with a radar warning receiver (RWR), wherein the radar warning receiver outputs RWR video at a first output and real threat track file data at a second output, the in-flight radar warning receiver training system comprising:
   a) a real on/off switch having first terminal and a second terminal where the first terminal is connected to the second output of the radar warning receiver;
   b) a means for formatting real track file data having a data input and a formatted data output, wherein the data input is connected to the second terminal of the real on/off switch;
   c) means for generating threat/RWR simulated threat track file data;
   d) means for merging the formatted real threat track file data with the threat/RWR simulated threat track file data to form a combined threat track file at an output, wherein the merging means has a first input coupled the formatted data output, and a second input coupled to the generating means to receive the threat/RWR simulated threat track file data;
   e) means for prioritizing the combined threat track file data, the prioritizing means being connected to the output of the merging means to receive the combined threat track file data, the prioritizing means including a priority data output for carrying prioritized threat track file data;
   f) a symbol generator having an input connected to the priority data output;
   g) an audio/voice generator having an input connected to the priority data output; and
   h) a means for storing threat events having an input connected to the priority data output.

9. The in-flight radar warning receiver training system of claim 8 wherein the means for generating threat/RWR simulated threat track file data further comprises:
   a) a means for simulating threat activity having a threat activity output;
   b) a means for simulating RWR activity having an input connected to the threat activity output, where the RWR activity simulating means includes an output; and
   c) a means for storing simulated track file data connected at an input to the output of the RWR activity simulating means.

10. The in-flight radar warning receiver training system of claim 8 further comprising a training on/off switch connected between the means for generating threat/RWR simulated threat track file data and the merging means.

11. The in-flight radar warning receiver training system of claim 8 further comprising a means for display and a power off default switch connected to bypass the formatting means, merging means, prioritizing means and means for generating RWR display symbology so as to send real RWR video symbology to the display means when the power off default switch operates in a default mode.

12. The in-flight radar warning receiver training system of claim 8 further comprising a means for data transfer having an input coupled to receive data from the means for storing threat events.

13. The in-flight radar warning receiver training system of claim 8 wherein the means for simulating threat activity further comprises means for activating a simulated threat within a selected range.

14. The in-flight radar warning receiver training system of claim 8 wherein the means for simulating threat activity further comprises means for calculating whether a threat radar emitter can detect a target aircraft.

15. The in-flight radar warning receiver training system of claim 14 wherein the means for calculating may employ line-of-sight calculations based on terrain data, and radar cross section of target aircraft, and other factors known to bear upon threat simulation scenarios.

16. The in-flight radar warning receiver training system of claim 8 wherein the means for simulating threat activity further comprises a means for disabling and enabling the means for simulating threat activity in response to an external command.

17. The in-flight radar warning receiver training system of claim 8 wherein the prioritizing means further comprises means for selecting threat priorities in response to a pilot input for selecting priority.

18. The in-flight radar warning receiver training system of claim 8 wherein the means for selecting threat priorities comprises means for selecting a low altitude priority and a high altitude priority.

19. The in-flight radar warning receiver training system of claim 18 wherein the prioritizing means further comprises means for assigning threat priorities from at least one priority table.

20. The in-flight radar warning receiver training system of claim 19 further comprising:
   a) an operator controls data interface for storing current and past switch positions of pilot selectable switches; and
   b) a process operator control coupled to the operator controls data interface and also coupled to the real on/off switch, power off default switch and training on/off switch.

* * * * *